United States Patent [19]
Kobayashi et al.

[11] Patent Number: 5,979,527
[45] Date of Patent: Nov. 9, 1999

[54] HEAVY DUTY PNEUMATIC RADIAL TIRES WITH AT LEAST THREE BEAD PORTION RUBBERS

[75] Inventors: Yasuhiko Kobayashi; Yuichi Nagai, both of Kodaira, Japan

[73] Assignee: Bridgestone Corporation, Tokyo, Japan

[21] Appl. No.: 08/889,092

[22] Filed: Jul. 7, 1997

[30] Foreign Application Priority Data

Jul. 8, 1996 [JP] Japan ................................. 8-178097

[51] Int. Cl.⁶ ......................... B60C 13/00; B60C 15/00; B60C 15/06
[52] U.S. Cl. ......................... 152/525; 152/539; 152/543; 152/546; 152/547
[58] Field of Search .................. 152/539, 543, 152/547, 525, 541, 546, 554

[56] References Cited

U.S. PATENT DOCUMENTS

| | | | |
|---|---|---|---|
| 4,019,551 | 4/1977 | Kolowski et al. ............. | 152/547 X |
| 4,941,523 | 7/1990 | Galante et al. | |
| 5,048,584 | 9/1991 | Nakano et al. | |
| 5,196,077 | 3/1993 | Kaga . | |
| 5,236,031 | 8/1993 | Honbo et al. | |

FOREIGN PATENT DOCUMENTS

| | | |
|---|---|---|
| 0 659 596 A2 | 6/1995 | European Pat. Off. |
| 0 749 855 A1 | 12/1996 | European Pat. Off. |
| 0 798 139 A2 | 10/1997 | European Pat. Off. |
| 2 670 160 | 6/1992 | France . |

OTHER PUBLICATIONS

Patent Abstracts of Japan, vol. 017, No. 123 (M–1380), Mar. 15, 1993 & JP 04 306108 A, Oct. 28, 1992 (Abstract).
Abstract of JP–A–3–42310, Feb. 22, 1991, Japan (Bridgestone Corp).
Abstract of JP–A–7–137507, May 30, 1995, Japan (Bridgestone Corp).
Abstract of JP–A–7–144517, Jun. 6, 1995, Japan (Bridgestone Corp.).

*Primary Examiner*—Adrienne C. Johnstone
*Attorney, Agent, or Firm*—Sughrue, Mion, Zinn, Macpeak & Seas, PLLC

[57] ABSTRACT

A heavy duty pneumatic radial tire comprises a pair of bead portions, a pair of sidewall portions, a tread portion, a radial carcass ply and a belt, in which at least three rubber layers having different hardnesses exist in a zone ranging from the cords in a turnup portion of the carcass ply to an axially outer portion of the bead portion throughout a region of the bead portion corresponding to a line drawn normal to the axially outer portion of the bead portion in a contact area increased portion of the bead portion sandwiched between two contact end positions of an axial outside surface of the bead portion on a flange of a design rim as measured under particular conditions, and the at least three rubber layers are comprised of a coating rubber of the carcass ply and a softest rubber layer and a hardest rubber layer, and the softest rubber layer and hardest rubber layer have particular values of 100% modulus.

5 Claims, 4 Drawing Sheets

FIG_1

FIG_2

HEAVY DUTY PNEUMATIC RADIAL TIRES WITH AT LEAST THREE BEAD PORTION RUBBERS

BACKGROUND OF THE INVENTION

1. Field of the Invention

This invention relates to heavy duty pneumatic radial tires for use in heavy duty vehicles such as a truck, bus, industrial vehicle, construction vehicle and so on. More particularly it relates to a heavy duty pneumatic radial tire having an improved bead portion durability without increasing the weight of bead portion.

2. Description of Related Art

Heavy duty pneumatic radial tires used in the above heavy duty vehicles are apt to cause problems in the bead portion, mainly separation failure because a force applied to the bead portion is large during running under loading. To this end, there have been proposed various techniques for improving bead portion durability, mainly resistance to separation failure. Among them, it is well-known that the rigidity of the bead portion is further improved by an additional arrangement of a reinforcing member such as a nylon chafer, wire chafer or the like. Alternatively the rigidity distribution is corrected by the rationalization of carcass line.

These improving means are effective to control not only so-called falling deformation of the bead portion in the tire at a state of inflating under a given air pressure and at a state of loading under a given load but also the shearing deformation in the circumferential direction of the bead portion at positions corresponding to a stepping-in region and kicking-out region of the tread portion, so that they are widely adopted as a technique for contributing to the improvement of bead portion durability.

However, the additional arrangement of the above reinforcing member naturally brings about not only the increase of weight but also rise of cost due to the increase of material cost and number of production steps, so that it is unsuitable in the existing severe price competition for the tire industry Further, the other means not causing a weight increase such as the correction of the carcass line and the like certainly develop a given effect under relatively mild use conditions, but can not be adapted at the existing state of more severe use conditions and hence they are confirmed to insufficiently develop the given bead portion durability.

In a pneumatic radial tire for large-size construction vehicle among the heavy duty tires, it is usual to adopt so-called high turnup structure such that the height of the carcass turnup portion is particularly set to a level largely higher than that of the other kind of tire and sometimes set to a level at about a position corresponding to a maximum width of the tire in order to improve the cut resistance of the sidewall portion. Therefore, any conventional means attempting to improve the separation failure in the turnup portion are difficult to serve as an effectively improving countermeasure. Because a largest strain acts on a position near to a flange height of a rim during the running of the tire under the loading the large-size tire is considerably large in the bending ratio under the loading as compared with that of the other kind of tire.

In the case of the large-size tire, separation failure (problem of bead portion) is caused along a portion of the turnup ply far away from the turnup end existing in a region contacted with the rim flange due to the aforementioned large bending ratio during the running under the loading. That is, even if all of the conventional techniques inclusive of the above improving means are applied to the problems particular to the large-size tire, they are not the conclusive factor for the development of the bead portion durability satisfying commercial demand.

SUMMARY OF THE INVENTION

It is, therefore, an object of the invention to provide heavy duty pneumatic radial tires capable of developing sufficiently improved bead portion durability even under severe use conditions not dealing with the rationalization of the carcass line or the like without increasing the tire weight and the cost.

According to the invention, there is the provision of a heavy duty pneumatic radial tire comprising a pair of bead portions, a pair of sidewall portions, a tread portion, a carcass ply extending between a pair of bead cores embedded in the bead portions and containing rubberized cords arranged in a radial direction of the tire and wound around each bead core from inside toward outside to form a turnup portion and a belt arranged on an outer periphery of the carcass ply, characterized in that at least three rubber layers of rubber material having different hardnesses exist in a zone ranging from the cords in the turnup portion of the carcass ply to an axially outer portion of the bead portion throughout a region of the bead portion corresponding to a line drawn normal to the axially outer portion of the bead portion in a contact area increased portion of the bead portion sandwiched between on the one hand, a contact end position of an axial outside surface of the bead portion on a flange of a design rim when the tire in an assembly of the tire and the rim is inflated at a maximum air pressure and, on the other hand, a contact end position of an axial outside surface of the bead portion on the rim flange when a load corresponding to a maximum loading ability of the tire is applied to the assembly inflated at the maximum air pressure, and a rubber layer among the above rubber layers is a coating rubber for the cords in the carcass ply and a softest rubber layer in the remaining rubber layers is arranged adjacent to the coating rubber along its axial outside surface and a hardest rubber layer is arranged adjacent to the softest rubber layer along its axial outside surface, and the softest rubber layer has a 100's modulus of not more than 20 kgf/cm$^2$ and a 100% modulus of the hardest rubber layer is not less than 3 times that of the softest rubber layer.

The terms "design rim", "maximum air pressure" and "maximum loading ability" used herein are defined by technical terms described in TRA YEAR BOOK (1996), in which the design rim is determined in accordance with the kind and size of a tire and a ply rating by this YEAR BOOK, and the maximum loading ability is indicated by bold-faced loading ability value (lbs) described in TIRE LOAD LIMITS AT VARIOUS COLD INFLATION PRESSURES of the same YEAR BOOK, provided that when single wheel and dual wheel are described together, the value of the single wheel is adopted, and the maximum air pressure is an air pressure corresponding to the maximum loading ability.

In the invention, the term "the region of the bead portion corresponding to the line drawn normal to the axially outer portion of the bead portion in the contact area increased portion of the bead portion" used herein means a region of the bead portion passing through an arbitrary point on a curved face of the contact area increased portion and opposing to the contact area increased portion in a linear direction perpendicular to a tangential face of the contact area increased portion at this point. In fact, the region of the bead portion corresponding to the contact area increased portion in the radial direction is preferably a region sandwiched between a line drawn normal to the carcass ply from the contact end position of the axial outside surface of the bead portion on the rim flange when the tire is inflated at a maximum air pressure and a line drawn normal to the carcass play from the contact end position of from the axial outside surface of the bead portion on the rim flange under the above loading.

In another preferable embodiment of the invention, the softest rubber layer is a sidewall rubber, or the hardest rubber layer is an insert rubber or a rubber chafer.

BRIEF DESCRIPTION OF THE DRAWINGS

The invention will be described with reference to the accompanying drawings, wherein.

DESCRIPTION OF PREFERRED EMBODIMENTS

Figure 1:
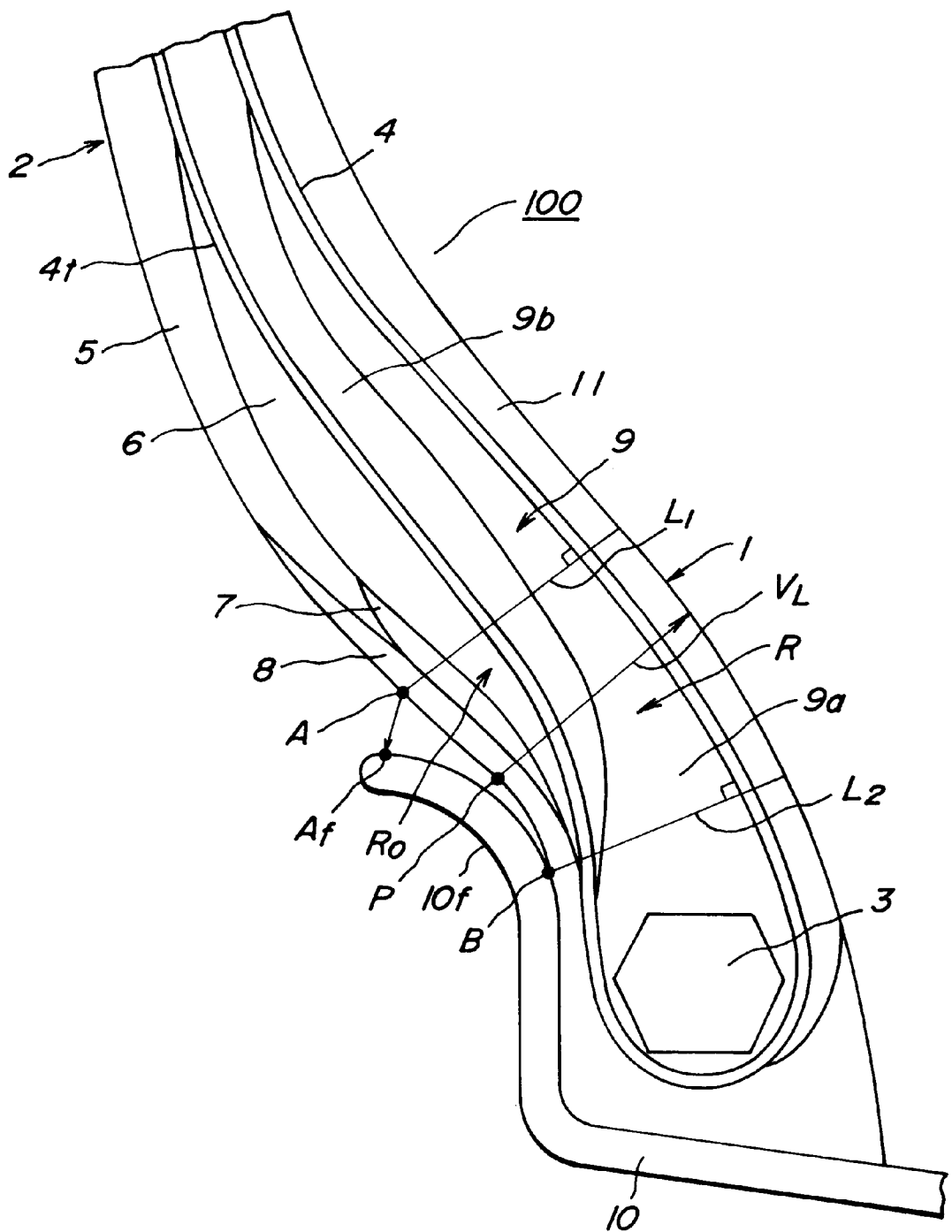
FIG. 1 is a diagrammatically cross-sectional view of a main part of a first embodiment of the heavy duty pneumatic radial tire according to the invention.
Figure 2:
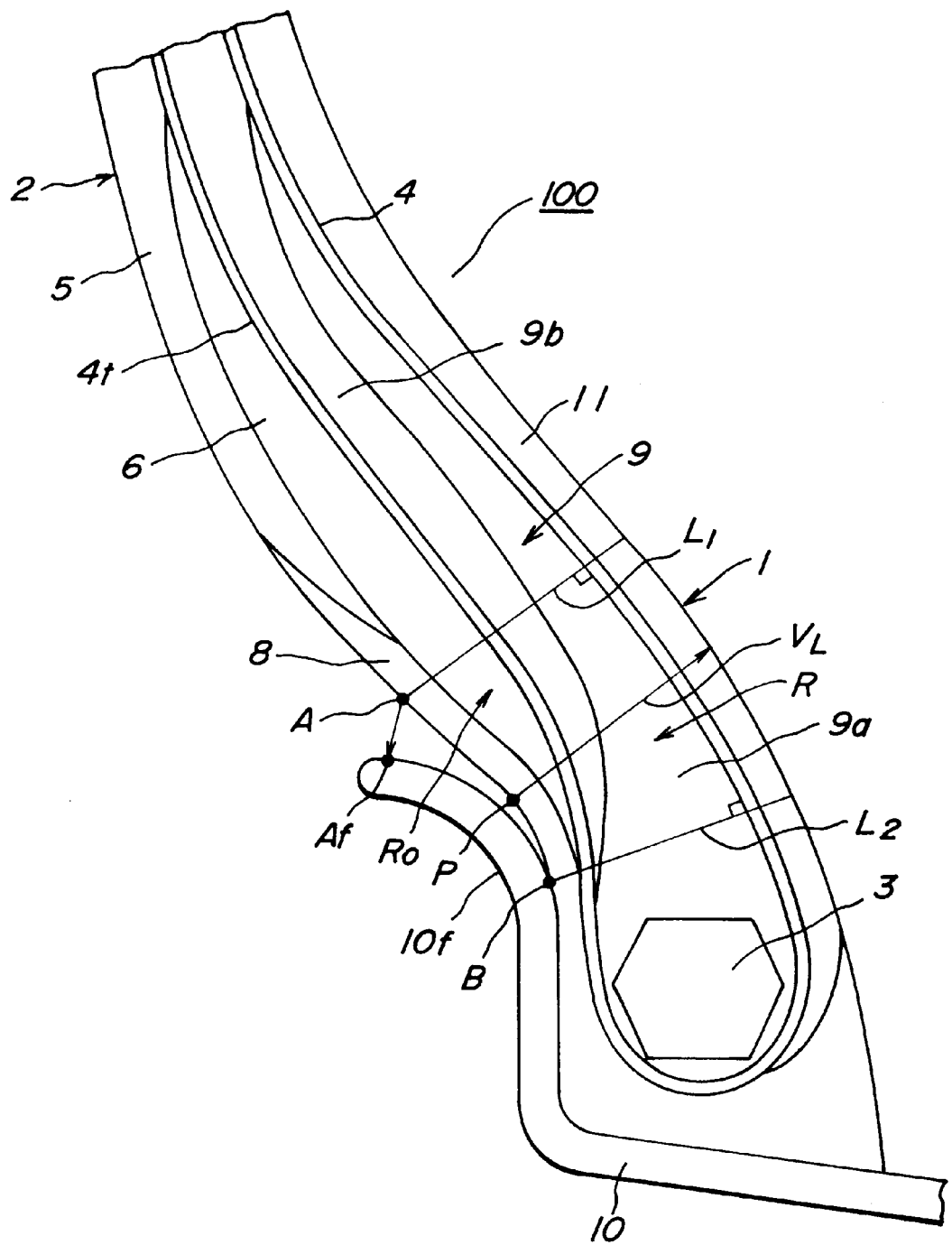
FIG. 2 is a diagrammatically cross-sectional view of a main part of a second embodiment of the heavy duty pneumatic radial tire according to the invention.
Figure 3:
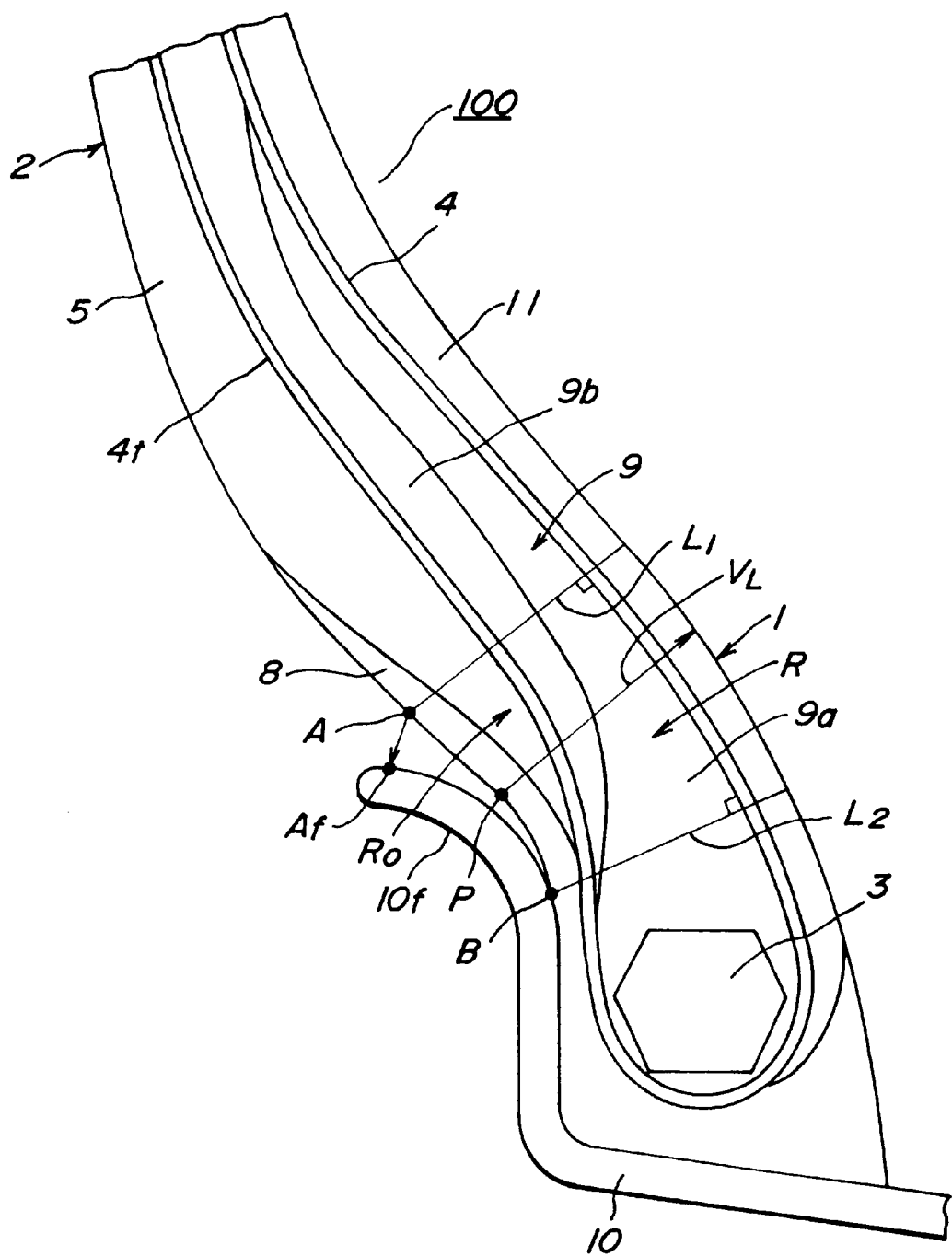
FIG. 3 is a diagrammatically cross-sectional view of a main part of a third embodiment of the heavy duty pneumatic radial tire according to the invention.

FIGS. 1–3 are diagrammatically cross-sectional views of main parts in various embodiments of the heavy duty pneumatic radial tire 100 (hereinafter referred to as tire or radial tire) assembled into a design rim 10 described in the aforementioned TRA YEAR BOOK, respectively. Each of these figures is a left-side cross-sectional view the tire from bead portion to sidewall portion in a radial direction of the tire when the tire 100 is inflated at a highest air pressure described in the above YEAR BOOK.

In FIGS. 1–3, the tire 100 comprises a pair of bead portions 1 and a pair of sidewall portions 2 (only one-side is shown in any case) and a tread portion (not shown), and is provided with a radial carcass ply 4 of rubberized cords, particularly steel cords extending between bead cores 3 embedded in the bead portions 1 to reinforce the bead portions 1, the sidewall portions 2 and the tread portion and a belt (not shown) reinforcing the tread portion on the outer periphery of the carcass ply 4 and comprised of plural cord cross layers, particularly steel cord cross layers according to usual practice.

The carcass ply 4 extends between a pair of the bead cores 3 and is wound around each of the bead cores 3 from inside toward outside to form a turnup portion 4t. In the illustrated embodiment, the turnup portion 4t has a high turnup structure extending near to a maximum width of the tire. Although both surfaces of the carcass ply 4 are simply illustrated by two curves in each figure, the cords, desirably steel cords (not shown) exist in a center of the ply in the thickness direction thereof and the cords are closely covered with the coating rubber.

Rubber 5 constituting the sidewall portion 2 extends from each side end of the tread (not shown) down to a zone of each of the bead portions 1 and is overlapped with a rubber chafer 8 to connect to the bead portion 2. In this case, an outward end in the radial direction at an outside surface of the rubber chafer 8 extends over an outside edge of a flange 10f of a rim 10 from a viewpoint of the arrangement purpose.

Under the above various constructional members and the arrangement relation thereof, when an assembly of the tire 100 inflated under the above highest air pressure with the rim 10 is loaded under a load corresponding to the maximum load ability of the tire (hereinafter referred to as maximum load), the bead portion 1 and the sidewall portion 2 connecting to the ground contact region of the tread create a bending deformation or so-called fall-down deformation directed outward to the widthwise direction of the tire and inward to the radial direction. By such a fall-down deformation, the contact end position of the outside surface of the bead portion 1 from the flange 10f of the rim 10 is shifted from a position B at only a state of inflating under the highest air pressure to a position A which increases the contact area between the outside surface of the bead portion 1 and the flange 10f. The term "contact end position" used herein means an outermost position of the bead portion 1 contacting with the flange 10f in the radial direction.

The outside surface of the bead portion 1 sandwiched between the contact end position A and the contact end position B is called a contact area increased portion. This increased portion is not same as in a direction of the ground contact region along a circumferential line of the tread, so that the contact end position A is a position just under a load indicating a maximum fall-down deformation and near thereto and hence the contact area increased portion is determined by an unload state after the removal of the load. Moreover, the behavior of the fall-down deformation of the bead portion 1 is typically shown by an arrow from the contact end position A, so that the top of the arrow in the fall-down deformation meets with a position Af on the flange 10f of the rim 10.

At least three rubber layers of rubber material having different hardnesses exist in a zone $R_0$ ranging from cord, desirably steel cord (not shown) in the turnup portion 4t of the carcass ply 4 to the axial outside portion of the bead portion at a region R of the bead portion 1 corresponding to a direction of a normal line $V_L$ (arrow direction) drawn in the contact area increased portion of the bead portion from an arbitrary point P on the contact area increased portion between the bead portion 1 and the flange 10f of the rim 10 accompanied with the above fall-down deformation. The term "normal line $V_L$" used herein means a straight line passing through an arbitrary point P on a curved face of the contact area increased portion (curved line in FIGS. 1–3) and perpendicular to a tangential face of the contact area increased portion at this point P (tangential line in FIGS. 1–3).

In practical use, it is useful that the region R of the bead portion 1 is specified to a region sandwiched between a normal line $L_1$ drawn from the contact end position A of the outside surface of the bead portion 1 (outermost position in the radial direction) to the carcass ply 4 and a normal line $L_2$ drawn from the contact end position B of the outside surface of the bead portion (outermost position in the radial direction) to the carcass ply 4 and hence the zone $R_0$ ranging from the cords in the turnup portion 4t of the carcass ply 4 to the outside surface of the bead portion is located in the region R. The zone $R_0$ is naturally extended over a full circumference of the tire and at least three rubber layers of rubber material having different hardnesses exist in the zone $R_0$, one of which layers is a coating rubber for the turnup portion 4t.

Among the remaining two or more rubber layers other than the coating rubber for the cord, a rubber layer arranged adjacent to the turnup portion 4*t* along its outside surface is a cushion rubber 6 in FIGS. 1 and 2 and a sidewall rubber 5 in FIG. 3. These rubber layers are required to be a softest rubber material at the zone $R_0$. Furthermore, a rubber layer among one or more remaining rubber layers is arranged adjacent to the softest rubber layer along its outside surface and is an insert rubber 7 in FIG. 1 and a rubber chafer 8 made from a hardest rubber material in FIGS. 2 and 3.

The softest rubber layer is required to have a 100% modulus of not more than 20 kgf/cm$^2$, while the 100% modulus of the hardest rubber layer is required to be not less than 3 times that of the softest rubber layer. From these facts, it is naturally clear that the hardness and 100% modulus of the coating rubber for the carcass ply 4 are values between those of these softest and hardest rubber layers, respectively. Moreover, the cushion rubber 6 is a rubber member developing the same stress mitigating function as a cushion rubber usually used in an end portion of the belt, while the insert rubber 7 is a rubber member usually disposed among plural constructional members.

When the fall-down deformation is created in a region ranging from the sidewall portion 2 to the bead portion 1, the bead portion 1 takes a rotating form around the bead core 3 as it is. As a result, the rubber layers existing in the zone $R_0$ are considerably compressed between the turnup portion 4*t*, more particularly the cords, i.e. steel cord of the turnup portion 4*t* and the flange 10*f* of the rim 10. Such a large compression strain creates a large flowing deformation in the rubber layers outward in the radial direction along the flange 10*f*, so that the rubber layers are subjected to a large shearing deformation. Such a shearing deformation is transmitted to the outside surface of the turnup portion 4*t* of the carcass ply 4. In the conventional tire, therefore, as the running distance increases, separation failure is created in a boundary between the cords, particularly steel cord of the turnup portion 4*t* and the coating rubber or in the vicinity of the cords.

On the contrary, in the zone $R_0$ of the bead portion 1 according to the invention, the softest rubber layer, i.e. the cushion rubber 6 in FIGS. 1 and 2 and the sidewall rubber 5 in FIG. 2 is arranged adjacent to the turnup portion 4*t* along its outside surface, so that the shearing deformation transmitted from the flange 10*f* of the rim 10 in the fall-down deformation is absorbed by the softest rubber layer, whereby the shearing stress applied to the outside surface of the turnup portion 4*t* can largely be mitigated. In order to enhance such a mitigating effect to a level of actually preventing the occurrence of separation failure, the 100% modulus of the softest rubber layer should be not more than 20 kgf/cm$^2$.

Further, the hardest rubber layer, i.e. the insert rubber 7 in FIG. 1 and the rubber chafer 8 in FIGS. 2 and 3 is arranged adjacent to the softest rubber layer along its outside surface, whereby the flowing displacement of the rubber layer existing in the zone $R_0$ in the fall-down deformation can be decreased to mitigate the shearing stress applied to the outside surface of the turnup portion 4*t*. If only the softest rubber layer is existent in the zone $R_0$, the rigidity of the bead portion 1 is lacking and the quantity of the fall-down deformation increases and hence the effect of the arrangement of the softest rubber layer is diminished and also the relative movement between the flange 10*f* and the rubber of the bead portion contacting with the flange through falling down increases to promote the wearing of rubber. These drawbacks can be eliminated by the arrangement of the hardest rubber layer. In order to effectively develop the above effects, the 100% modulus of the hardest rubber layer is required to be not less than 3 times that of the softest rubber layer.

On the other hand, if only the hardest rubber layer or a harder rubber layer near thereto exists in the zone $R_0$, the occurrence of separation failure in the turnup portion 4*t* is unavoidable. Therefore, the combination of the softest rubber layer and the hardest rubber layer is applied to the zone $R_0$, whereby the shearing strain applied to the outside surface of the turnup portion 4*t* can advantageously be reduced while providing sufficient rigidity to the bead portion and the resistance to separation in the bead portion 1 can considerably be improved.

When the 100% modulus of the softest rubber layer exceeds 20 kgf/cm$^2$, the shearing stress can not sufficiently be mitigated. From this point, it is desirable that the value of the 100% modulus is made small as far as possible. On the other hand, when the 100% modulus of the hardest rubber layer is less than 3 times that of the softest rubber layer, the aforementioned drawbacks can not sufficiently be eliminated. From this point, the larger the ratio of 100% modulus of hardest rubber layer to softest rubber layer, the better the result.

Moreover, the three or more rubber layers of rubber material having different hardnesses in the zone $R_0$ are preferred to have a cross-sectional shape extending outward from the zone $R_0$ in the radial direction as shown in FIGS. 1–3. Numeral 9 is a stiffener, in which 9*a* is a hard stiffener and 9*b* is a soft stiffener, and numeral 11 is an innerliner, which are arranged according to the conventional structure and may particularly be selected to have optimum hardness and arrangement in connection with the hardest rubber layer and the softest rubber layer.

The following examples are given in illustration of the invention and are not intended as limitations thereof.

There are provided four radial tires for construction vehicle having a tire size of 37.00R57. In these tires, the carcass ply 4 is a rubberized ply containing steel cords arranged in the radial direction of the tire. The structure ranging from the bead portion 1 to the sidewall portion 2 is according to FIGS. 1–3, in which Example 1 corresponds to FIG. 1 and Examples 2 and 3 correspond to FIG. 2 and Example 4 corresponds to FIG. 3. Moreover, the softest rubber layer in Example 4 corresponds to the sidewall rubber 5. In order to inspect the effect of each example, there is provided a tire 100A having a structure shown in FIG. 4 as a conventional example. In these tires, values of 100% modulus M100 (unit: kgf/cm$^2$) of rubber layers are shown in Table 1.

TABLE 1

Figure 4:
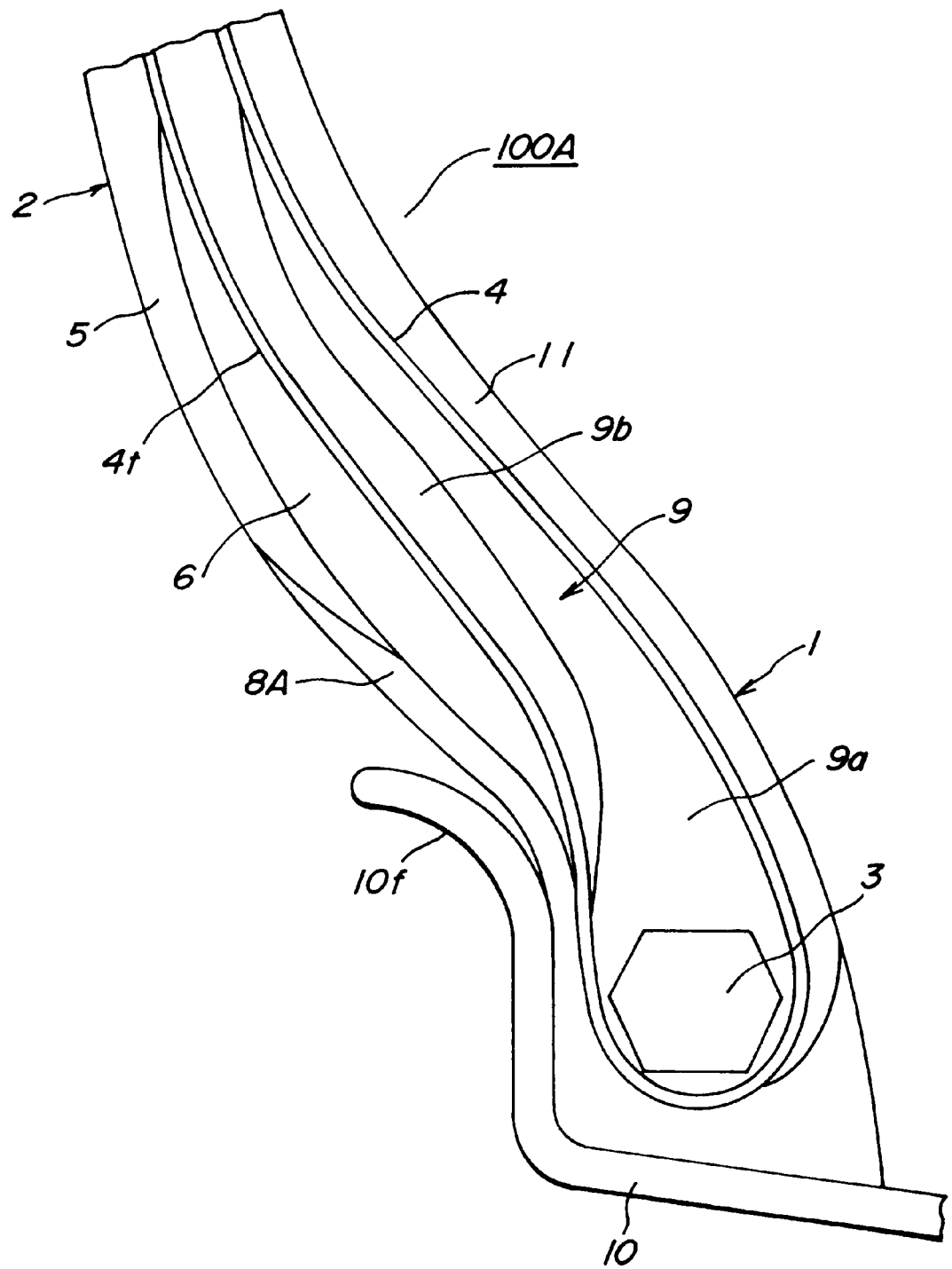
FIG. 4 is a diagrammatically cross-sectional view of a main part of the conventional heavy duty pneumatic radial tire.

| Items | Example | | | | Conventional Example |
|---|---|---|---|---|---|
| | 1 | 2 | 3 | 4 | |
| Figure applied to structure | FIG. 1 | FIG. 2 | FIG. 2 | FIG. 3 | FIG. 4 |
| Coating rubber for carcass ply ($M_{100}$) | 35 | 35 | 35 | 35 | 35 |
| Cushion rubber 6, 6A ($M_{100}$) | 19 | 19 | 16 | — | 26 |
| Insert rubber 7 ($M_{100}$) | 69 | — | — | — | — |
| Rubber chafer 8, 8A ($M_{100}$) | 33 | 58 | 63 | 58 | 33 |
| Sidewall rubber 5 ($M_{100}$) | 18 | 18 | 18 | 18 | 18 |

The durability of the bead portion is evaluated by a drum test with respect to each of these tires. The test method and conditions are as follows:

(1) The tread rubber is cut out from the tread portion so as to surely create the problem of the bead portion prior to the occurrence of the belt separation.

(2) The tire is inflated under a highest air pressure of 7 kgf/cm$^2$ and placed on a drum rotating at a surface speed of 10 km/h under an initial loading of 51.5 ton (100% load corresponding to an approximately maximum load) and then a load is increased stepwise after the running for a given time. When the problem of the bead portion is created in any one of the five tires, the test for all tires is stopped.

When the problem of the bead portion (problem at the outside of the bead portion) is visually confirmed from the appearance of the conventional tire as is predicted, the test for all tires is stopped and thereafter these tires are taken out from the testing machine to measure the problem of the bead portion and the degree thereof by dissection.

As a result, separation failure is considerably created around the zone $R_0$ in the conventional tire without dissection, while slight separation, which can not be observed from the appearance of the tire, is observed only at the outside of the turnup portion 4t in the tires of Examples 1 and 2 and the sign of separation failure can not be observed in the tires of Examples 3 and 4. Moreover, the weights of the above five tires are approximately the same as measured from new tires thereof.

As mentioned above, the invention can provide heavy duty pneumatic radial tires capable of advantageously improving the durability of the bead portion while maintaining the high productivity without requiring the arrangement of additional reinforcing members and increasing the tire weight.

What is claimed is:

1. A heavy duty pneumatic radial tire assembled on a design rim comprising; a pair of bead portions, a pair of sidewall portions, a tread portion, a carcass ply extending between a pair of bead cores which are embedded in the bead portions, said carcass ply containing rubberized cords arranged in a radial direction of the tire and wound around each bead core from inside toward outside to form a turnup portion, and a belt arranged on an outer periphery of the carcass ply, wherein in each bead portion at least three rubber layers of rubber material having different hardnesses exist in a zone ranging from the cords in the turnup portion of the carcass ply to an axially outer portion of the bead portion throughout a region of the bead portion corresponding to a line drawn normal to the axially outer portion of the bead portion in a contact area increased portion of the bead portion sandwiched between on the one hand, a contact end position of an axial outside surface of the bead portion on a flange of the design rim when the tire is inflated at a maximum air pressure and, on the other hand, a contact end position of an axial outside surface of the bead portion on the rim flange when a load corresponding to a maximum loading ability of the tire is applied to the assembly inflated at the maximum air pressure, and a rubber layer among the at least three rubber layers is a coating rubber for the cords in the carcass ply, and a softest rubber layer of the remaining rubber layers is arranged adjacent to the coating rubber along its axial outside surface, and a hardest rubber layer is arranged adjacent to the softest rubber layer along its axial outside surface, wherein the softest rubber layer has a 100% modulus of not more than 20 kgf/cm$^2$ and a 100% modulus of the hardest rubber layer is not less than 3 times that of the softest rubber layer.

2. A heavy duty pneumatic radial tire assembled on a design rim according to claim 1, wherein the region of the bead portion corresponding to the contact area increased portion in the radial direction is a region sandwiched between a line drawn normal to the carcass ply from the contact end position of the axial outside surface of the bead portion on the rim flange when the tire is inflated at maximum air pressure and a line drawn normal to the carcass ply from the contact end position of the axial outside surface of the bead portion on the rim flange under said applied load.

3. A heavy duty pneumatic radial tire assembled on a design rim according to claim 1, wherein the softest rubber layer is a sidewall rubber.

4. A heavy duty pneumatic radial tire assembled on a design rim according to claim 1, wherein the hardest rubber layer is an insert rubber.

5. A heavy duty pneumatic radial tire assembled on a design rim according to claim 1, wherein the hardest rubber layer is a rubber chafer.

\* \* \* \* \*